United States Patent [19]

Korin et al.

[11] Patent Number: 4,498,459
[45] Date of Patent: Feb. 12, 1985

[54] PHASE-CHANGE HEAT STORAGE BUILDING PANELS

[75] Inventors: Eliyaho Korin, Beer Sheva; Elazar Rappaport, Ramat Ha-Sharon; Dov Pasternak, Arad; Aharon S. Roy, Beer-Sheva; David Wolf, Omer, all of Israel

[73] Assignee: Ben-Gurion University of the Negev, Beer Sheva, Israel

[21] Appl. No.: 446,572

[22] Filed: Dec. 3, 1982

[51] Int. Cl.³ ............................................. F24J 3/02
[52] U.S. Cl. .................................. 126/430; 126/400; 126/431; 126/452; 52/306
[58] Field of Search ............... 126/430, 431, 400, 417, 126/436, 444, 452; 47/14; 350/259; 52/171, 306, 307, 308; 252/71, 79

[56] References Cited

U.S. PATENT DOCUMENTS

| 504,544 | 9/1893 | Van der Heyden | 126/431 X |
|---|---|---|---|
| 3,960,205 | 6/1976 | Laing | 126/400 X |
| 3,986,969 | 10/1976 | Telkes | 126/400 X |
| 4,008,758 | 2/1977 | Chubb | 126/400 X |
| 4,108,373 | 8/1978 | Chiapale et al. | 126/431 |
| 4,131,158 | 12/1978 | Abhat et al. | 126/400 X |
| 4,234,782 | 11/1980 | Barabas et al. | 126/400 X |
| 4,253,983 | 3/1981 | Blanie | 126/400 X |
| 4,338,208 | 7/1982 | Lane et al. | 126/400 X |

Primary Examiner—Larry Jones

[57] ABSTRACT

The invention provides a phase change heat storage, light and temperature control building panel comprising a sealed housing having at least two walls transparent to visible light delimiting at least one intermediate space filled with a liquid-solid phase-change heat-storage material, wherein the material is substantially transparent to visible light in solid and in liquid phase, adsorbs heat while melting, releases heat while solidifying and undergoes phase change in a temperature range of about 5°–28° C. The invention also provides a method of day light and temperature control and night temperature control in dwelling units and plant enclosures utilizing the panels of the invention.

8 Claims, 3 Drawing Figures

PHASE-CHANGE HEAT STORAGE BUILDING PANELS

Figure 1:
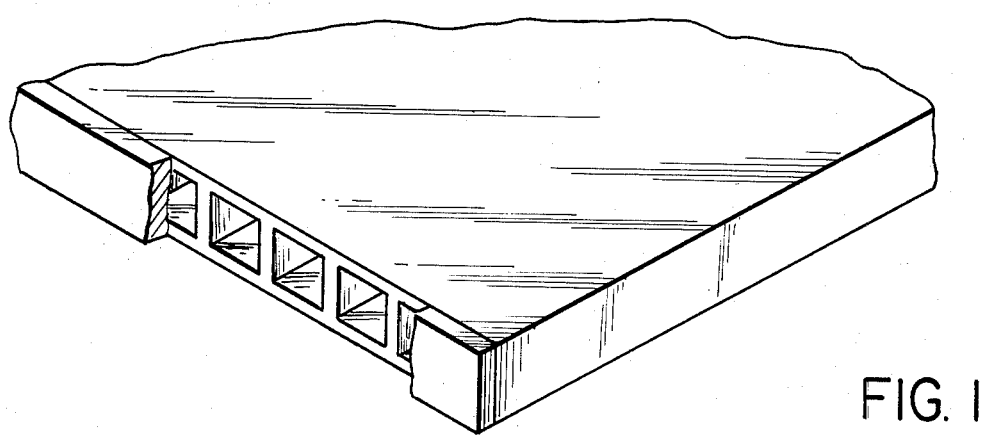
FIG. 1 shows the building panel as per the present invention.
Figure 2:
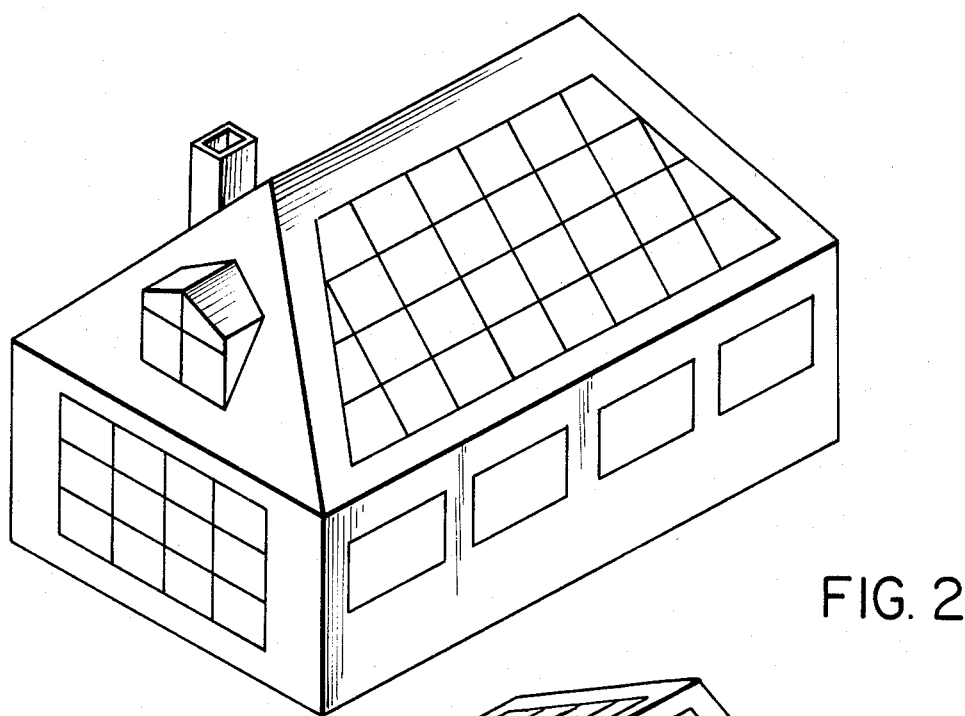
FIG. 2 shows the building panel utilized as wall and skylight elements in a dwelling.
Figure 3:
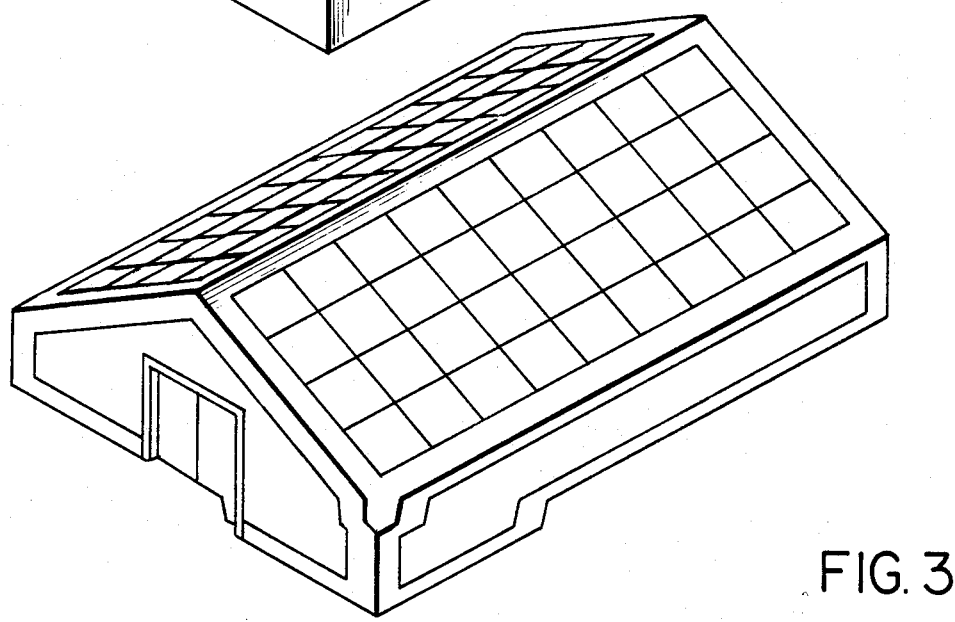
FIG. 3 shows the building panel utilized to form the walls and roof of a greenhouse structure.

The present invention relates to a phase-change heat storage building panel. More particularly, the present invention relates to a phase-change heat-storage light and temperature control building panel and to methods of day light and temperature, and night temperature control of plant enclosures, dwelling units and other structures, using said panel.

It has been proposed respectively by the Brookhaven National Laboratory, New York, and Suntek Research Associates, California, as reported in Application of Solar Energy 1978 (Proceedings of the Third Southeastern Conference on Application of Solar Energy (pp. 131-143) to incorporate phase change heat storage systems based on the encapsulation or mixing of phase change materials into a structural masonary to provide high heat storage structural materials for a variety of building heating and cooling applications as well as the production of a high porosity and high permeability concrete block material permeated with a phase change material and sealed to serve as a modular unit in a heat storage system.

Similarly, the pumping, circulation and storage of fluids heated by solar energy and passing through enclosure walls of buildings and enclosures in which plants are cultivated have been described in such publications as U.S. Pat. Nos. 3,563,305 and 4,108,373, however, said systems are based on the storage of heated liquid in reservoirs for recirculation and heat dispersion at night and involve costly and complicated pumping facilities.

In contradistinction to said prior art systems which also have not been viewed as interrelated prior to the present invention, there is now provided a phase change heat storage light and temperature control building panel comprising a sealed housing having at least two walls transparent to visible light delimiting at least one intermediate space filled with a liquid-solid phase-change heat-storage material, wherein said material is substantially transparent to visible light in solid and in liquid phase, adsorbs heat while melting, releases heat while solidifying and undergoes phase change in a temperature range of about 5°-28° C.

The present invention also provides a method of day light and temperature control and of night temperature control of an enclosure in which plants are cultivated comprising providing a panel according to the invention as at least part of said enclosing surface whereby said panel serves as a window for visible light when said phase-change heat-storage material is in solid and in liquid phase and limits heat penetration by absorbing heat while melting and reduces heat loss from said enclosure by releasing heat while solidifying as well as a method of day light and temperature control of a dwelling unit and other structures comprising providing a panel according to the invention as at least part of the outer enclosure thereof whereby said panel serves as a window for visible light when said phase-change heat-storage material is in solid and in liquid phase and limits heat penetration by absorbing heat while melting and reduces heat loss from said enclosure by releasing heat while solidifying.

In said latter method the self-contained panels of the present invention are preferably installed as a roof skylight and/or window of said dwelling and other structures while in said first method said panels from one or more of the roofing panels of the plant enclosure or greenhouse.

Since it is important and intended that the phase-change material sealed in the panels of the present invention not only serve as a heat storage temperature control medium but also as a light control medium as well, phase-change materials must be chosen which are substantially transparent to visible light in solid and in liquid phase.

While phase change compositions per se are described in the prior art, e.g. in U.S. Pat. Nos. 4,272,390; 4,189,394; 2,706,716 and 2,677,664 and in European Patent Application No. 0,013,569, the present invention provides for the first time a transparent housing filled with a liquid-solid phase-change heat-storage material, wherein said material is substantially transparent to visible light in solid and in liquid phase, adsorbs heat while melting, releases heat while solidifying and undergoes phase change in a temperature range of about 5°-28° C., which housing functions both as a light and temperature control element.

In one preferred embodiment of the present invention said material is a single paraffin or a mixture of paraffins which together undergo phase change in a temperature range of 5°-28° C.

Thus, e.g., the following paraffins (obtained from Humphrey Chemical Co., Devine St., North Haven, Conn. U.S.) can be used.

| Material | Solidifying Point (°C.) | Latent heat kjoules/kg |
|---|---|---|
| (1) n-octadecane ($C_{18}H_{38}$) | 28.0 | 243.8 |
| (2) n-heptadecane ($C_{17}H_{36}$) | 22.0 | 213.6 |
| (3) n-Hexadecane ($C_{16}H_{34}$) | 17.8 | 200.0 |
| (4) n-pentadecane ($C_{15}H_{32}$) | 10.0 | 206 |

In other preferred embodiments of the present invention said material is a liquid-solid phase-change heat storage salt mixture which undergoes phase change in a temperature range of about 5°-28° C.

Preferred salt mixtures found to be useful in the panels of the present invention are respectively a salt mixture comprising $CaCl_2$, KCl, water and a neucleating agent, a salt mixture comprising $CaCl_2$, $MgCl_2$, water and a neucleating agent and a salt mixture comprising $CaBr_2.6H_2O$, $CaCl_2.6H_2O$ and a neucleating agent.

Preferred are salt mixtures comprising about 40-52% $CaCl_2$, about 4-7.5% KCl, about 40-56% $H_2O$ and a neucleating agent and salt mixtures comprising about 31-42% $CaCl_2$, about 10-15% $MgCl_2$, about 45-55% $H_2O$ and a neucleating agent.

Various neucleating agents, such as, $Ba(OH)_2.8H_2O$ and $SrCl_2.6H_2O$ can be used and the use of $SrCl_2.6H_2O$ is especially preferred.

Especially preferred for use in the panels of the present invention are salt mixtures of $CaCl_2.6H_2O$ and $CaBr_2.6H_2O$ such as a salt mixture comprising about 70% $CaCl_2.6H_2O$ about 30% $CaBr_2.6H_2O$ and a neucleating agent.

Experimental results have surprisingly shown that the hydrates $CaCl_2.6H_2O$ and $CaBr_2.6H_2O$ dissolve in one another throughout the range of concentrations and create solid solutions. This conduit is characteristic of mixtures of isomorphous materials and is commensurate with the fact that in hydrates $CaCl_2.6H_2O$ and $CaBr_2.6H_2O$ the crystal cells is hexagonal in shape, with similar cell parameters as follows: (8.138A.4.015A) $CaBr_2.6H_2O$, (7,860A,3905A) $CaCl_2.6H_2O$.

The great importance of this system lies in the fact that in all the ranges of concentrations and temperatures there is no incongruent phase-transition point. Therefore it is possible to adapt the ranges of temperature desirable for heat collection between 10° C.-28° C. by changing the quantitative ratio of the two hydrates $CaCl_2.6H_2O$, and $CaBr_2.6H_2O$ between 90:10 wt % and 10:90 wt % $CaCl_2.6H_2O:CaBr_2.6H_2O$ as illustrated in the following Table 1.

TABLE 1

Experimental results of phase-transition heat and densities of various mixtures

| Change in specific volume $Cm^3/gr$ | Phase transition heat per unit vol. $J/cm^3$ | $cal/cm^3$ | solid density $g/cm^3$ | liquid density $g/cm^3$ | Latent heat $J/gr$ | $cal/gr$ | Phase-transition temperature °C. | Material Composition % Wt |
|---|---|---|---|---|---|---|---|---|
| 0.0799 | 251.3 | 60.0 | 1.73 | 1.52 | 165.3 | 39.5 | 25–27.5 | 10 $CaBr_2.6H_2O$, 90 $CaCl_26H_2O$ |
| 0.0615 | 255.5 | 61.0 | 1.75 | 1.58 | 161.6 | 38.6 | 23.5–19.5 | 20 $CaBr_2.6H_2O$, 80 $CaCl_2.6H_2O$ |
| 0.0579 | 251.2 | 61.6 | 1.80 | 1.63 | 157.0 | 38.5 | 19.5–17.5 | 30 $CaBr_2.6H_2O$, 70 $CaCl_2.6H_2O$ |
| 0.0612 | 253.7 | 60.6 | 1.86 | 1.67 | 152.0 | 36.3 | 16–14 | 40 $CaBr_2.6H_2O$, 60 $CaCl_26H_2O$ |

Density of materials in solid state was measured at 5° C.
Density in liquid state was measured at 40° C.
Phase transition heat per unit volume has calculated in relation to the density of the liquid state at 40° C.

The mixtures described and tested in Table 1 were prepared from $CaBr_2$ solution of 52% concentration (manufactured by Bromine Compounds Beer-Sheva Ltd) and $CaCl_2.2H_2O$ (Merck, Germany) with water being added to reach the appropriate hexahydrate compositions. The mixtures were heated to 40° C. until a homogenous solution was obtained, and after stirring for 15 minutes, the solution was cooled to 5° C. until the complete crystallization of the material.

The mixture was then heated in a heating bath (KT-52, Haake, Germany), at a rate of 0.2°-0.4° C./min. Temperature as a function of time was measured and recorded by means of a thermocouple (Copper-Constanten, Type J. connected to a digital thermometer Data logger, Model 590 TC, United Systems Corporation). From the graph of temperature as a function of time the temperature of the commencement and completion of the mixture was determined.

This experiment was conducted for mixtures of different weight ratios. The structure of the crystals was also examined by X-ray.

From the experimental results it also transpired that the additon of 1–1.5% of the materials: $SrCl_2.6H_2O$, $BaCl_2.2H_2O$, $Ba(OH)_2.8H_2O$ can serve for nucleation of the various mixtures of $CaCl_2.6H_2O$ and $CaBr_2.6H_2O$.

$SrCl_2.6H_2O$ and $SrBr_2.6H_2O$ (which may be obtained in a system as a result of the addition of $SrCl_2.6H_2O$) are isomorphic to the hydrates of $CaCl_2.6H_2O$ and $CaBr_2.6H_2O$ of which the mixture are composed. The crystal cells of these hydrates are hexagonal in shape: (8.228A, 72.416A) $SrBr_2.6H_2O$, (7.963A, 4.959A) $SrCl_2.6H_2O$.

This fact explains the suitability of these hydrates to serve as nucleators in this system.

Hydrates $BaBr_2.2H_2O$ and $BaCl_2.2H_2O$, $Ba(OH)_2.8H_2O$ (which may be obtained form the addition of these two hydrates) are monoclinic in shape: $Ba(OH)_2.8H_2O$ (11.845A, 9.277A, 99° 00') $BaCl_2.2H_2O$ (6.720A, 10.907A, 7.135A, 91° 09').

The suitability of these materials to serve as nucleators in the mixtures can be explained by the fact that there is a certain correlation between one of the lattice planes of these hydrates, and the crystal cells of the solid solutions of $CaBr_2.6H_2O$ and $CaCl_2.6H_2O$ formed in this system.

The experimental results constitute an innovation because of the data on the solubility of $CaBr_2.6H_2O$ and $CaCl_2.6H_2O$ in the solid state, and particularly on their potential utilization for heat storage at ambient temperatures for purposes of heating buildings.

From the above the following conclusions were reached:

(a) By means of mixtures of the hydrates $CaCl_2.6H_2O$ and $CaBr_2.6H_2O$ one can obtain materials suitable for heat storage at chosen temperatures within the 10°–28° C. range. Determination of the phase-transition temperature is done by changing the relative quantities of the two hydrates in the mixture. In these mixtures there are no incongruent phase-transition points and therefore they may be suitable for heat storage in passive systems as well.

(b) Heat capacity of the various mixtures is about 60 $cal/cm^3$.

(c) The addition of 1–1.5% of each of the following materials:
$SrCl_2.6H_2O$, $BaCl_2.2H_2O$, $Ba(OH)_2.8H_2O$ are suitable to serve as nucleators to expedite the rate of nuclation and decrease the degree of super-cooling of the crystallization process to 1°–2° C.

(d) The various mixtures can be created from mixing of the solution produced at Bromide Compounds Beer-Sheva with a concentration of 52% $CaBr_2$.

While the invention will now be described in connection with certain preferred embodiments with reference to the following illustrative experiments so that it may be more fully understood, it is stressed that the particulars shown and described are by way of example and for purposes of illustrative discussion only, and are presented in the cause of providing what is believed to be the most useful and readily understood description of the principles and conceptual aspects of the invention. In this regard, no attempt is made to discuss structural details of panels according to the invention and methods for the use thereof in more detail than is necessary for a fundamental understanding of the invention, the description taken with the illustrative experiments making apparent to those skilled in the art how the several forms of the invention may be embodied in practice.

DESCRIPTION OF THE TWO TESTED GREENHOUSES

The two tested buildings were of identical shape and size (5.9×10.8×3.0 m) in an area of 64 m². The roof has two slopes of 22°, one facing westwards and the other eastwards.

The side walls were built from opaque and well insulated polyurethane plates of 4 mm thickness. The inside walls were covered with light-reflecting aluminium foil. This minimized the influence of the walls and simulated the performance of actual large-scale greenhouses. The roof was constructed from double-wall transparent polycarbonate (Poligal) panels, with a wall thickness of 0.5 mm.

Each panel is 1.8 m length, 0.8 m width, and 0.01 m thick, and is divided into 80 channels.

In the tested solar greenhouses the panels were filled with a salt hydrate mixture of the following composition (wt %): 70 $CaCl_2.6H_2O$ and 30 $CaBr_2.6H_2O$ with addition of 1% $BaCl_2.2H_2O$ as nucleator agent. The mixture undergoes phase change (liquid-solid) between 17°–15° C. with latent heat density of 60 Cal/cm³.

In the control greenhouse the polycarbonate panels were filled with an aqueous solution containing about 35% $CaCl_2$. This solution is in homogeneous liquid state above 0° C., therefore, there is no phase change process in the working range temperature of Beer-Sheva. Hence, any differences between the tested and control greenhouses can be related solely to the phase change process which occurs in the tested solar greenhouse. The construction of the greenhouses was completed on Jan. 20, 1982.

Light distribution inside the two model greenhouses and out of doors was measured during winter days in five spots inside the structures five times during the daylight hours. Measurements were carried out with a L-Quantum/Radiometer/Photometer (Lamda Instruments). A light sensor Model LI 2105 (Licor) was used.

Light was measured perpendicular to the ground at a height of ~100 meter. Typical results are given in Table 2. It can be seen that:

(a) Light distribution in the passive solar greenhouse was more even than in the control greenhouse.

(b) Light penetrated into the passive solar greenhouse during the solid and the liquid phase.

As can be seen from Table 3, air temperatures in the passive greenhouse were higher than in the control and out of doors both during a cloudy and during a clear night.

Table 4 illustrates typical night temperature profiles of roof and air, in a passive solar greenhouse.

Table 5 shows variations in soil temperature at a depth of 15 cm inside the passive solar greenhouse and in the control greenhouses.

Table 6 gives some preliminary data on rose development inside the two structures.

TABLE 2

Light distribution at various spots inside a passive solar greenhouse, and in a control greenhouse during daylight hours (outdoor light = 100%)

| | | Solid | | | Liquid | |
|---|---|---|---|---|---|---|
| hour | | 8.00 | 10.00 | 12.00 | 14.00 | 16.00 |
| passive solar | 1 | 34.4 | 24.0 | 28.8 | 23.5 | 73.3 |
| | 2 | 38.5 | 33.3 | 45.0 | 35.3 | 79.8 |
| | 3 | 29.2 | 26.7 | 37.5 | 30.9 | 74.5 |
| | 4 | 29.2 | 26.7 | 30.0 | 22.0 | 64.0 |
| | 5 | 32.7 | 28.0 | 33.8 | 47.0 | 70.7 |
| control | 1 | 27.5 | 14.7 | 18.8 | 29.4 | 73.3 |
| | 2 | 48.2 | 56.0 | 77.5 | 44.1 | 82.7 |
| | 3 | 67.4 | 60.0 | 76.2 | 29.4 | 73.3 |
| | 4 | 32.7 | 20.0 | 17.5 | 22.1 | 60.0 |
| | 5 | 50.0 | 48.0 | 43.8 | 39.7 | 80.0 |
| Outdoors (Lux) | | 29000 | 75000 | 80000 | 68000 | 7500 |

1 - SE corner;
2 = NE corner;
3 = NW corner;
4 = SW corner;
5 = center

TABLE 3

Variations in air temperature at 1.5 m height in a passive solar greenhouse in a control greenhouse and out of doors during a cloudy and clear night

| hour | 16.00 | 17.00 | 18.00 | 19.00 | 20.00 | 21.00 | 22.00 | 23.00 | 24.00 | 01.00 | 02.00 | 03.00 | 04.00 | 05.00 | 06.00 | 07.00 | 08.00 |
|---|---|---|---|---|---|---|---|---|---|---|---|---|---|---|---|---|---|
| clear night (10.2.81) | | | | | | | | | | | | | | | | | |
| Passive solar | 25.9 | 19.1 | 16.7 | 15.4 | 14.3 | 12.8 | 12.2 | 11.0 | 11.2 | 11.2 | 11.5 | 10.5 | 9.4 | 8.6 | 9.2 | 9.3 | 14.1 |
| control | 23.0 | 16.0 | 12.6 | 11.1 | 10.3 | 9.4 | 9.2 | 8.2 | 8.3 | 8.8 | 8.9 | 8.3 | 7.1 | 6.7 | 6.7 | 7.4 | 13.7 |
| outdoors | 15.4 | 13.2 | 11.8 | 10.7 | 10.1 | 8.1 | 8.2 | 7.4 | 8.3 | 8.6 | 8.4 | 7.7 | 6.6 | 6.5 | 7.4 | 7.5 | 9.9 |
| cloudy night (14.2.82) | | | | | | | | | | | | | | | | | |
| Passive solar | 20.7 | 18.2 | 16.0 | 15.0 | 14.5 | 13.9 | 13.3 | 13.5 | 12.9 | 12.8 | 12.8 | 12.1 | 12.1 | 11.8 | 11.6 | 12.0 | 12.3 |
| Control | 19.4 | 15.9 | 13.2 | 12.4 | 12.0 | 11.6 | 11.3 | 11.3 | 11.0 | 11.0 | 10.9 | 10.2 | 10.3 | 10.0 | 9.3 | 10.2 | 10.8 |
| Outdoors | 14.3 | 12.9 | 12.0 | 11.8 | 11.5 | 10.6 | 11.1 | 10.8 | 10.5 | 10.8 | 10.6 | 9.8 | 10.3 | 9.4 | 9.6 | 9.3 | 9.6 |

TABLE 4

Variations in air temperature inside a passive solar greenhouse outdoors temperature and roof temperature during a clear night (10.2.82)

| Hour | 16.00 | 17.00 | 18.00 | 19.00 | 20.00 | 21.00 | 22.00 | 23.00 | 24.00 | 01.00 | 02.00 | 03.00 | 04.00 | 05.00 | 06.00 | 07.00 | 08.00 |
|---|---|---|---|---|---|---|---|---|---|---|---|---|---|---|---|---|---|
| passive solar | 25.9 | 19.1 | 16.7 | 15.4 | 14.3 | 12.8 | 12.2 | 11.0 | 11.2 | 11.2 | 11.5 | 10.5 | 9.4 | 8.6 | 9.2 | 9.3 | 14.1 |
| roof temperature | 29.7 | 18.6 | 18.1 | 17.3 | 15.7 | 12.3 | 10.6 | 8.7 | 9.3 | 9.8 | 10.0 | 8.6 | 7.0 | 6.4 | 6.9 | 7.2 | 11.1 |
| outdoors | 15.4 | 13.2 | 11.8 | 10.7 | 10.1 | 8.1 | 8.2 | 7.4 | 8.3 | 8.6 | 8.4 | 7.7 | 6.6 | 6.5 | 7.4 | 7.5 | 9.9 |

TABLE 5

Diurnal Variation in soil temperature (15 cm depth) in a passive solar and in a control greenhouse during a cloudy day (14.2.82) and a clear day (10.2.82)

| 10.2.82 | | | | | | | | | | | | |
|---|---|---|---|---|---|---|---|---|---|---|---|---|
| Hour | 8.00 | 9.00 | 10.00 | 11.00 | 12.00 | 13.00 | 14.00 | 15.00 | 16.00 | 17.00 | 18.00 | 19.00 |

TABLE 5-continued

Diurnal Variation in soil temperature (15 cm depth) in a passive solar and in a control greenhouse during a cloudy day (14.2.82) and a clear day (10.2.82)

| Passive solar | 13.6 | 13.7 | 14.3 | 15.1 | 16.2 | 17.5 | 18.7 | 19.6 | 20.1 | 20.3 | | 19.8 | 19.3 |
|---|---|---|---|---|---|---|---|---|---|---|---|---|---|
| control | 13.2 | 13.4 | 13.2 | 13.3 | 13.9 | 14.6 | 15.2 | 16.0 | 16.3 | 17.1 | | 17.3 | 17.3 |
| Hour | 20.00 | 21.00 | 22.00 | 23.00 | 24.00 | 1.00 | 2.00 | 3.00 | 4.00 | 5.00 | 6.00 | 7.00 | 8.00 |
| Passive solar | 18.9 | 18.4 | 17.9 | 17.5 | 17.0 | 16.7 | 16.4 | 16.1 | 15.8 | 15.5 | 15.1 | 14.9 | 14.7 |
| control | 17.2 | 17.1 | 16.7 | 16.5 | 16 2 | 15.8 | 15.6 | 15.2 | 15.1 | 14.9 | 14.7 | 14.5 | 14.3 |

14.2.82

| Hour | 8.00 | 9.00 | 10.00 | 11.00 | 12.00 | 13.00 | 14.00 | 15.00 | 16.00 | 17.00 | | 18.00 | 19.00 |
|---|---|---|---|---|---|---|---|---|---|---|---|---|---|
| Passive solar | 15.8 | 15.7 | 16.0 | 16.5 | 17.0 | 17.4 | 17.7 | 17.9 | 18.4 | 18.6 | | 18.4 | 18.2 |
| control | 14.1 | 15.9 | 13.9 | 14.1 | 14.4 | 14.9 | 15.1 | 15.1 | 15.4 | 15.6 | | 15.8 | 16.0 |
| Hour | 20.00 | 21.00 | 22.00 | 23.00 | 24.00 | 1.00 | 2.00 | 3.00 | 4.00 | 5.00 | 6.00 | 7.00 | 8.00 |
| Passive solar | 17.9 | 17.5 | 17.3 | 17.1 | 16.9 | 16.7 | 16.4 | 16.3 | 16.1 | 15.9 | 15.8 | 15.6 | 15.9 |
| control | 15.8 | 15.7 | 15.7 | 15.5 | 15.4 | 15.3 | 15.1 | 15.0 | 14.8 | 14.8 | 14.7 | 14.5 | 14.7 |

TABLE 6

Growth of flower plants 27.1.82

(8a) Sprouting of vegetative buds, number of buds per branch (average of 90 branches per greenhouse)

| Date | 11.2.82 | 18.2.82 | 25.2.82 |
|---|---|---|---|
| Solar greenhouse | 3.16 | 4.17 | 4.02 |
| Control greenhouse | 1.81 | 2.80 | 2.28 |

(8b) Number of flowers at first picking (average of 90 branches per greenhouse)

| Date | 31.3.82 | 11.4.82 |
|---|---|---|
| Solar greenhouse | 0.59 | |
| Control greenhouse | | 0.45 |

(8c) Average weight of flowering branch (mean of 10 branches)

| Days after planting | Solar greenhouse | Control greenhouse |
|---|---|---|
| 16 | 2.1 | 1.0 |
| 23 | 3.2 | 1.9 |
| 30 | 5.6 | 2.5 |
| 42 | 20.1 | 9.8 |
| 52 | 35.4 | 25.9 |
| 64 | 42.3 | 32.8 |

The surprisingly superior results achieved by using the panel and method of the present invention are readily noted from the above tabulated results.

It was also noted that providing a removable polyethylene sheet or bubble plastic sheet over said panel at night further augmented the effect thereof by reducing the convection loss of heat therefrom during the night hours.

As indicated hereinbefore, paraffins having the appropriate properties can also be used in the panels of the present invention and even exhibit superior light transmitting properties as shown in Table 7 hereinafter.

TABLE 7

% Light transmission through panel on a clear day

| Content of Panel | % Light transmitted at hour of the day | | | |
|---|---|---|---|---|
| | 8:30 | 10.30 | 12:30 | 14:30 |
| N—hexadecame $C_{16}H_{34}$ | 42.2 | 52.0 | 53.7 | 53.1 |
| 40% $CaBr_2.6H_2O$ 60% $CaCl_2.6H_2O$ | 37.5 | 40.8 | 47.4 | 44.8 |
| Air | 45.3 | 44.9 | 46.3 | 45.8 |

The results presented in Table 7 were measured with the same measurement equipment used in the model solar greenhouse (see Table 2) but in the small wooden boxes covered with 10 mm thick poligal panels filled with the various PCM given in Table 7. The dimensions of these boxes were 30×30×30 cm.

It will be evident to those skilled in the art that the invention is not limited to the details of the foregoing illustrative embodiments and examples and that the present invention may be embodied in other specific forms without departing from the essential attributes thereof, and it is, therefore, desired that the present embodiments and examples be considered in all respects as illustrative and not restrictive, reference being made to the appended claims, rather than to the foregoing description, and all changes which come with the meaning and range of equivalency of the claims are, therefore, intended to be embraced therein.

What is claimed is:

1. A phase change heat storage, light and temperature control building panel comprising a sealed housing having at least two walls transparent to visible light delimiting at least one intermediate space filled with a liquid-solid phase-change heat-storage material wherein said material is a salt mixture comprising from about 10–90% $CaBr_2.6H_2O$, about 90–10% $CaCl_2.6H_2O$ and a neucleating agent, said material being substantially transparent to visible light in solid and in liquid phase, adsorbs heat while melting, releases heat while solidifying and undergoes phase change at a temperature range of from about 5°–28° C.

2. A phase change heat storage light and temperature control building panel according to claim 1 wherein said salt mixture comprises $SrCl_2.6H_2O$ as a neucleating agent.

3. A phase change heat storage light and temperature control building panel according to claim 1 wherein said salt mixture comprises about 70% $CaCl_2.6H_2O$, about 30% $CaBr_2.6H_2O$ and a neucleating agent.

4. A phase change heat storage, light and temperature control building panel according to claim 1, wherein said housing is divided into a plurality of separate sealed compartments each filled with said material.

5. A method of day light and temperature control and night temperature control of an enclosure in which plants are cultivated comprising providing a panel as at least part of said enclosing surface whereby said panel serves as a window for visible light when said phase-change heat-storage material is in solid and in liquid phase, limits heat penetration by absorbing heat while melting and reduces heat loss from enclosure by releasing heat while solidifying, said panel comprising a sealed housing having at least two walls transparent to visible light delimiting at least one intermediate space filled with a liquid-solid phase-change heat-storage material wherein said material is a salt mixture comprising from about 10-90% $CaBr_2.6H_2O$, about 90-10% $CaCl_2.6H_2O$ and a neucleating agent, said material being substantially transparent to visible light in solid and in liquid phase, absorbs heat while melting, releases heat while solidifying and undergoes phase change at a temperature range of from about 5°-28° C.

6. A method of day and night light and temperature control of a dwelling unit and other structures comprising providing a panel as at least part of the outer enclosure thereof whereby said panel serves as a window for visible light when said phase-change heat storage material is in solid and in liquid phase, limits heat penetration by adsorbing heat while melting and reduces heat loss from said enclosure by releasing heat while solidifying, said panel comprising a sealed housing having at least two walls transparent to visible light delimiting at least one intermediate space filled with a liquid-solid phase-change heat-storage material wherein said material is a salt mixture comprising from about 10-90% $CaBr_2.6H_2O$, about 90-10% $CaCl_2.6H_2O$ and a neucleating agent, said material being substantially transparent to visible light in solid and in liquid phase, adsorbs heat while melting, releases heat while solidifying and undergoes phase change at a temperature range of from about 5°-28° C.

7. A method of day light and temperature control and night temperature of a dwelling unit and other structures according to claim 6, wherein said panel is installed as a roof skylight of said dwelling and other structures.

8. A method of day light and temperature control and night temperature control of a dwelling unit according to claim 6 wherein said panel is installed as a window of said dwelling.

* * * * *